Nov. 23, 1926.
G. K. CULP, JR., ET AL
1,608,305
THERMOSTATICALLY OPERATED ELECTRIC SWITCH
Original Filed Nov. 26, 1924
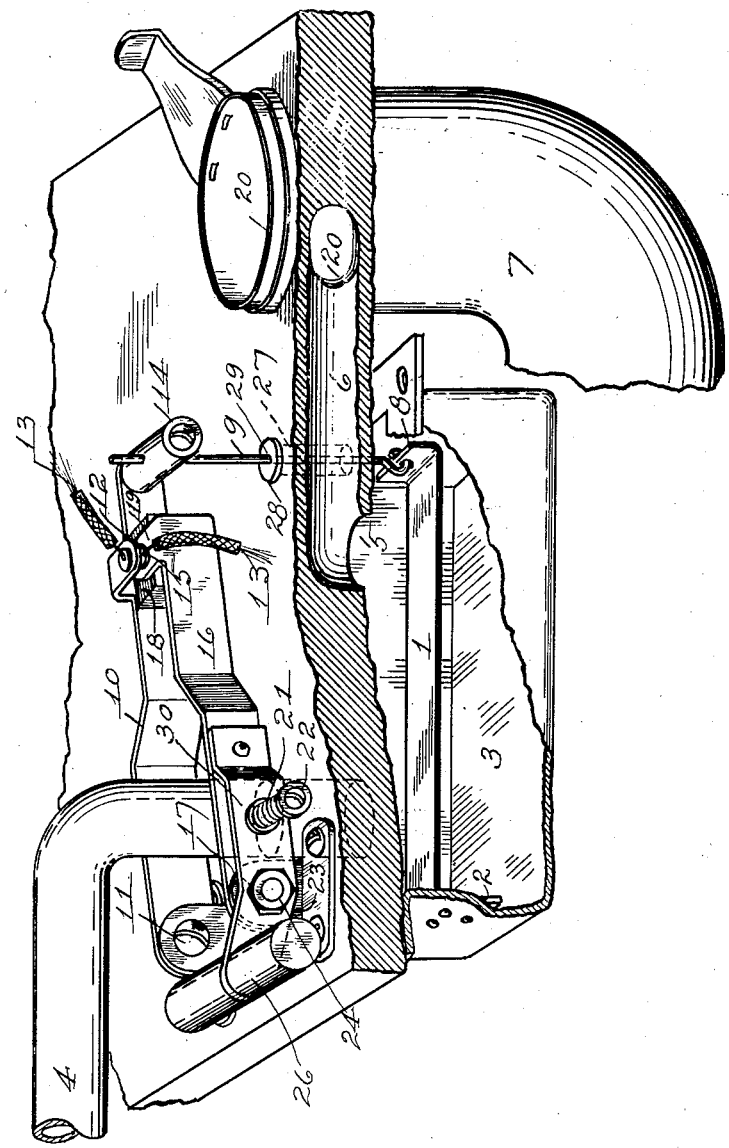
INVENTORS:
George K. Culp Jr.
Galen D. Barker
William J. Sturgis
BY Cyrus W. Rice
ATTORNEY.
Witness:
G. E. Redding Patented Nov. 23, 1926.

1,608,305

UNITED STATES PATENT OFFICE.

GEORGE K. CULP, JR., GALEN D. BARKER, AND WILLIAM J. STURGIS, OF DOWAGIAC, MICHIGAN, ASSIGNORS TO THE ELECTROMATIC APPLIANCE CORP., A CORPORATION OF DELAWARE.

THERMOSTATICALLY-OPERATED ELECTRIC SWITCH.

Original application filed November 26, 1924, Serial No. 752,429. Divided and this application filed October 14, 1925. Serial No. 62,344.

The present invention relates to thermostatically operated electric switches, and its object is, generally, to provide a switch, or circuit opener and closer, for electric circuits, improved in various respects hereinafter appearing; and more particularly, to provide an electric switch controlled by a thermostatic bar so formed as to exert its operating force in an approximately direct line; and further, to provide means for controlling such a switch, which shall act with equal promptness in the various positions in which the parts of the device may be.

These and any other objects hereinafter appearing are attained by, and the invention finds preferable embodiment in, the structure hereinafter particularly described in the body of this specification and illustrated by the accompanying drawing showing in perspective an electric switch and controlling means therefor, certain parts being broken away.

The thermostatic bar 1 is mounted at 2 inside a chamber 3 to which heated air or other gas may be admitted from the intake pipe 4 and may pass out through the vent 5 to the pipe 6 and its continuing pipe 6 which may be provided with a rotatable sleeve valve 20. As the air or other gas in this chamber 3 becomes heated, or as heated air or gas is admitted thereinto, the thermostatic bar 1 is flexed, carrying its free end 8 downwardly. The link 9 connects this thermostatic bar and the lever arm 10 pivotally mounted at 11 and carrying the upper contact point 12 of a switch or circuit closer and opener in the electric circuit indicated at 13, 13, the link 9 being pivoted at 14 on said arm. The lower contact point 15 of said switch is carried by a lever arm 16 pivotally mounted at 17 and having a slight swinging movement at its contact point-carrying end relatively to the arm 10, such relative movement being limited by said upper contact point 12 and by the ledge 18 of the arm 10 underlying the lateral extension 19 of the arm 16. The swinging movement of the arm 16 is braked or frictionally resisted by its spring portion 30 pressed yieldingly, by a spring 21 whose tension is adjustable by the nut 22, against the post 23 on which this arm is pivoted at 24. It will be seen that as the lever arm 10 swings upwardly under the action of the cooling thermostatic bar 1, the switch is opened and the lever arm 16 is thereupon swung upwardly by the ledge 18 engaging the extension 19; but as the heated thermostatic bar swings the lever arm 10 downwardly, the switch is quickly closed in whatever swung position these lever arms may be at the time the downward movement of the arm 10 begins. The two lever arms 10 and 16 are thus always carried so nearly together that the operation of the thermostatic bar to control the switch is equally prompt in any position to which these lever arms may be swung. The lever arm 16 may be counterbalanced at 26 as shown. This switch may be thus operated by any means adapted to swing the lever arm 10 as well as by the thermostatic bar 1.

In order that the force exerted by the thermostatic bar in operating the switch may be exerted as nearly as may be in one direct line, i. e., so that the link 9 may be moved laterally as slightly as possible to permit of its slidingly fitting as tightly as may be in the opening 27 through which it extends, and thus to confine the air or gas in the chamber 3 as completely as possible, the free end 8 of the thermostatic bar extends upwardly, as shown, so that, as said bar flexes and therefore shortens, its said free end may be inclined further outwardly, to thus maintain practically constant the distance between the thermostatic bar's mounting point 2 and the point at its free end 8 to which the link 9 is connected.

Furthermore: In order that the chamber 3 may confine the heated air or gas as completely as possible, the opening 27 through which the link 9 extends is covered by a disk 28 lying on the upper surface of the apparatus and having an opening 29 through which said link extends and in which it slidably fits. This disk is adapted to slide slightly on said surface with any slight lateral movement of this link occasioned by the swinging of the lever arm 10 on the thermostatic bar 1. This invention is described and illustrated in our application Serial Number 752,429, filed November 26, 1924, but not claimed therein.

The invention being intended to be pointed out in the claims, is not to be limited to or by details of construction of the particular embodiment thereof illustrated by the drawings or hereinbefore described.

We claim:

1. In a device of the character described: a chamber adapted to contain heated air; a thermostatic bar therein having a thermically flexing body portion and a free end portion extending in the plane of the body portion's flexing movement from its convexing side; an electric switch outside said chamber and having a swingable arm; a link freely-swingably connected to the arm and to the free end portion of the bar adjacent its outer extremity and extending through an opening in the wall of the chamber.

2. In a device of the character described: an electric switch comprising a pair of swingably mounted arms carrying the contacts points respectively of the switch and having a swinging movement relatively to each other limited in one direction by the contacting of said points and in the other direction by mutually abutting portions of the lever arms and either of said arms being movable with the other in one direction by the contacting of said points and in the other direction by the mutually abutting portions of the lever arms.

3. In a device of the character described: an electric switch comprising a pair of swingably mounted arms carrying the contact points respectively of the switch and having a swinging movement relatively to each other, limited in one direction by the contacting of said points and in the other direction by mutually abutting portions of the lever arms and either of said arms being movable with the other in one direction by the contacting of said points and in the other direction by the mutually abutting portions of the lever arms; a thermostatic bar; connections between said bar and one of said arms for swinging the same by the flexing of said bar.

In testimony whereof we have hereunto set our hands at Dowagiac, Michigan, this 3rd day of October, 1925.

GEORGE K. CULP, Jr.
GALEN D. BARKER.
WILLIAM J. STURGIS.